No. 683,805. Patented Oct. 1, 1901.
H. O. SAGENG.
VEHICLE TONGUE.
(Application filed Mar. 2, 1901.)
(No Model.)
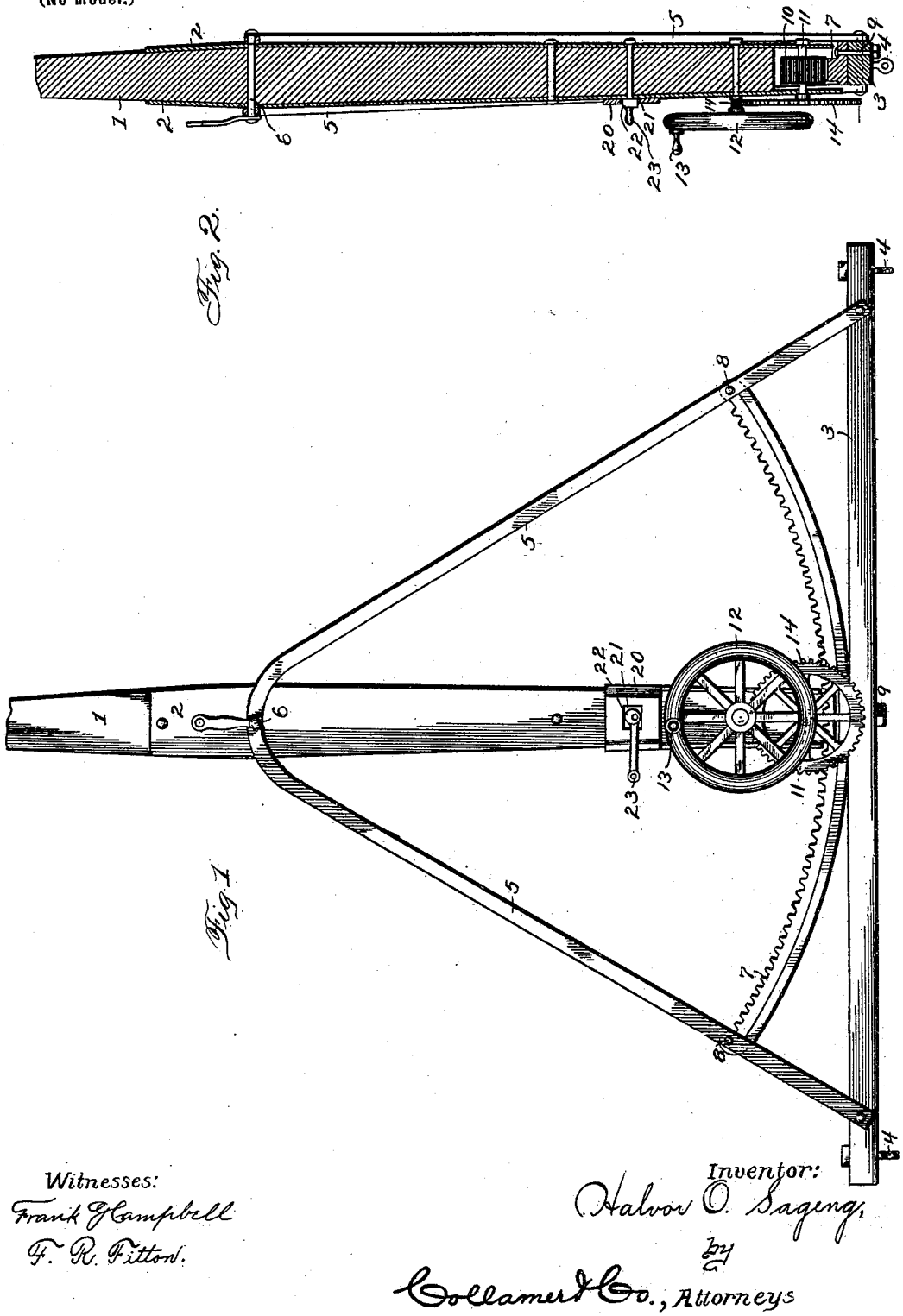

UNITED STATES PATENT OFFICE.

HALVOR O. SAGENG, OF MINNEAPOLIS, MINNESOTA.

VEHICLE-TONGUE.

SPECIFICATION forming part of Letters Patent No. 683,805, dated October 1, 1901.

Application filed March 2, 1901. Serial No. 49,581. (No model.)

*To all whom it may concern:*

Be it known that I, HALVOR O. SAGENG, a citizen of the United States, and a resident of Minneapolis, Hennepin county, State of Minnesota, have invented certain new and useful Improvements in Tongues; and my preferred manner of carrying out the invention is set forth in the following full, clear, and exact description, terminating with claims particularly specifying the novelty.

This invention relates to the running-gear of vehicles, more particularly that of traction-engines or the like, and especially to the tongues thereof.

The object of the invention is to connect the tongue with the pivoted forward axle of a vehicle in such manner that the angle of the tongue to the axle can be adjusted as desired and can be set after being so adjusted. It is well-known that the objection to the former method of rigidly attaching the tongue at right angles to the front axle is that when there are several vehicles connected or coupled into a train drawn by a traction-engine over a road much difficulty is experienced in rounding corners or turns in the road, especially where they are sharp. The traction-engine or "locomotive" of the train has its own steering mechanism; but the vehicles which follow will be drawn by this locomotive out of the road and into the culvert or ditch at the side thereof. A threshing outfit usually consists of the engine, tender, separator, and perhaps a stacker or a boarding-car, and it is clear that if one or several of these vehicles are drawn out of the road by a powerful engine and ditched much difficulty will be experience in restoring them to the roadway.

The present invention consists in a tongue so constructed and connected with a cross-bar at its rear end that the tongue can be set at various angles thereto and held when thus set, and this cross-bar is attached by any suitable means to the front or steering axle of each of the vehicles forming a part of the train above mentioned.

The invention is more fully described in detail in the following specification, reference being had to the accompanying drawings, wherein—

Figure 1 is a plan view of this tongue complete. Fig. 2 is a sectional view.

Referring to said drawings, 1 is the tongue proper, which is preferably of wood faced at top and bottom with metallic plates 2. 3 is a cross-bar, as of wood. 4 represents eyebolts or other devices for loosely and detachably connecting the extremities of this bar with the front axle of the vehicle. 5 5 are parallel and spaced braces leading from the extremities of this bar forward to points above and below the tongue, and 6 is a pivot-bolt passing through these braces and the tongue at a point where the latter extends between the former.

7 is a curved rack-bar secured at 8 at its extremities between the braces and preferably secured at 9 at its center to the cross-bar 3, and the teeth of this rack-bar project forwardly and stand in the arc of a circle struck around the bolt 6.

The adjusting mechanism comprises a toothed wheel 10, engaging the rack-bar 7 and fast on an upright shaft 11, journaled through the plates 2 beyond the rear extremity of the wooden portion 1 of the tongue, a hand-wheel 12, provided with a knob or handle 13, which wheel is fast on a shaft journaled through said plates and tongue forward of the shaft 11, and intermeshing gears 14, fast on these two shafts and preferably of such relative size that the rotation of the hand-wheel and power-shaft causes a slower but more powerful rotation of the toothed wheel 10. By this construction when it is desired to adjust the angle of the tongue to the cross-bar the hand-wheel is rotated by means of the knob or handle 13 to move the rear end of the tongue around within the rack-bar in the proper direction and to the desired extent.

In connection with the above I preferably employ a latch of some character, so as to lock the tongue in its adjusted position. In the present instance this latch consists of a plate 20, extending over the top of the rear end of the tongue and down on its two sides and slotted so as to move longitudinally on the tongue over the power-shaft on the hand-wheel. At the rear end of the plate its downturned edges are adapted to engage between the teeth of the rack-bar 7. At some point in the plate, preferably near its front end, as seen in Fig.

1, is formed a transverse hole 21, within which turns an eccentric 22, that is fast on the pivotal end of a handle 23, and when this handle is turned in the proper direction the plate is moved longitudinally of the shaft, so as to enter its locking end between the teeth of the rack-bar 7 or withdraw it therefrom. Obviously any other suitable form of lock could be substituted, if preferred, or the lock could be entirely omitted; but I prefer its use because of the great strain which will be brought to bear on the parts of my improved tongue when used as above first set forth in this specification.

I do not confine myself to the sizes, shapes, proportions, materials, or exact details of construction of the various parts, as considerable change can be made therein without destroying the object in view or departing from the spirit of the invention. In some instances the power-shaft and gears 14 may be omitted and the hand-wheel applied directly to the shaft 11. This tongue will be useful in other connections than that above described, and according as it is employed the manufacturer may vary the details as the exigencies of the particular case demand.

What is claimed as new is—

1. In an adjustable tongue, the combination with a cross-bar having means for attachment to the front axle of the vehicle, a pair of parallel braces bent at their centers and attached at their ends to said cross-bar, and a curved rack-bar attached at its extremities between said braces and at its center to the cross-bar; of the tongue proper pivoted between the braces on a bolt which stands at the center of the arc on which said rack-bar is struck, and adjusting mechanism carried by the tongue in rear of the pivoted bolt and engaging said rack-bar.

2. In an adjustable tongue, the combination with a cross-bar, a brace projecting forward therefrom, the tongue proper pivoted to said brace, and a rack-bar carried by the cross-bar and struck on the arc of a circle around said pivot; of plates secured above and below the tongue and projecting beyond its rear end, a shaft journaled through these plates and carrying a toothed wheel engaging the rack-bar, a hand-wheel for rotating the shaft, and a lock, each and all substantially as and for the purpose set forth.

3. In an adjustable tongue, the combination with a cross-bar, a brace projecting forward therefrom, the tongue proper pivoted to said brace, and a rack-bar carried by the cross-bar and struck on the arc of a circle around said pivot; of an upright shaft journaled in the tongue and carrying a toothed wheel meshing with said rack-bar, an additional shaft journaled in the tongue and carrying a hand-wheel having a knob or handle, and intermeshing gears of different sizes fast on these shafts, as and for the purpose set forth.

4. In an adjustable tongue, the combination with a cross-bar, a brace projecting forward therefrom, the tongue proper pivoted to said brace, and a rack-bar carried by the cross-bar and struck on the arc of a circle around said pivot; of a toothed wheel carried by the shaft and meshing with said rack-bar, means for rotating this wheel, and a lock consisting of a plate bent over the tongue and movable longitudinally thereon so that its rear end may engage the teeth of the rack-bar, and means independent of the adjusting mechanism for moving this lock at will, as and for the purpose set forth.

5. In an adjustable tongue, the combination with a cross-bar, a brace projecting forward therefrom, the tongue proper pivoted to said brace, and a rack-bar carried by the cross-bar and struck on the arc of a circle around said pivot; of a toothed wheel carried by the shaft and meshing with said rack-bar, means for rotating this wheel, and a lock consisting of a plate bent over the tongue and movable longitudinally thereon so that its rear end may engage the teeth of the rack-bar, said plate having a transverse slot, and a handle pivoted to the tongue within said slot and having an eccentric around its pivot, as and for the purpose set forth.

In testimony whereof I have hereunto subscribed my signature this the 18th day of February, A. D. 1901.

HALVOR O. SAGENG.

Witnesses:
H. F. ROSING,
H. M. DAHL.